(12) United States Patent
Verhagen et al.

(10) Patent No.: US 7,263,436 B2
(45) Date of Patent: Aug. 28, 2007

(54) METHOD AND DEVICE FOR ASCERTAINING THE CENTER-OF-GRAVITY HEIGHT OF A VEHICLE

(75) Inventors: Armin Verhagen, Schwieberdingen (DE); Dietmar Arndt, Hatvan (HU)

(73) Assignee: Robert Bosch GmbH, Stuttgart (DE)

( * ) Notice: Subject to any disclaimer, the term of this patent is extended or adjusted under 35 U.S.C. 154(b) by 458 days.

(21) Appl. No.: 10/681,994

(22) Filed: Oct. 8, 2003

(65) Prior Publication Data
US 2004/0133338 A1    Jul. 8, 2004

(30) Foreign Application Priority Data
Oct. 15, 2002    (DE)    ............... 102 47 993

(51) Int. Cl.
*G06G 7/48*    (2006.01)
(52) U.S. Cl. .................................... 701/124
(58) Field of Classification Search ............... 701/36, 701/38, 65, 72, 124; 180/172, 282, 290, 180/271; 340/440, 443; 702/173–175
See application file for complete search history.

(56) References Cited

U.S. PATENT DOCUMENTS

| | | | | |
|---|---|---|---|---|
| 5,825,284 | A * | 10/1998 | Dunwoody et al. | ......... 340/440 |
| 6,502,023 | B1 * | 12/2002 | Fukada | ................ 701/38 |
| 2002/0109310 | A1 * | 8/2002 | Lim | ................ 280/5.508 |
| 2003/0065430 | A1 * | 4/2003 | Lu et al. | ............ 701/45 |
| 2003/0236603 | A1 * | 12/2003 | Lu | ................ 701/37 |

FOREIGN PATENT DOCUMENTS

DE    199 18 597    11/2000

OTHER PUBLICATIONS

"Center of Gravity" Oct. 9, 1997, http://theoryx5.uwinnipeg.ca/physics/rot/node4.html pp. 1-2.*

* cited by examiner

*Primary Examiner*—Thu V. Nguyen
(74) *Attorney, Agent, or Firm*—Kenyon & Kenyon LLP

(57) ABSTRACT

A method and the associated device for ascertaining the center-of-gravity height of a motor vehicle, in which
- a variable representing the rolling motion of the vehicle about its roll axis oriented in the vehicle longitudinal direction is ascertained,
- a variable representing the lateral acceleration of the vehicle is ascertained,
- the center-of-gravity height is ascertained from the variable representing the rolling motion and the variable representing the lateral acceleration,
- the center-of-gravity height is ascertained only in predefined driving conditions,
- the change in the roll rate per unit of time entering into the ascertainment of the predefined driving conditions.

11 Claims, 3 Drawing Sheets

METHOD AND DEVICE FOR ASCERTAINING THE CENTER-OF-GRAVITY HEIGHT OF A VEHICLE

BACKGROUND INFORMATION

German Patent Application No. 199 18 597 describes a method for reducing the hazard of road vehicles overturning. This method constantly ascertains an overturn coefficient of the motor vehicle and compares it to a predefined limiting value. If this limiting value is exceeded, a steering intervention is automatically initiated which increases with decreasing side-tilt stability, and is reduced with increasing side-tilt stability or at least is held constant. At the beginning of each drive, the center-of-gravity height of the vehicle is estimated and the value is stored.

SUMMARY OF THE INVENTION

The present invention relates to a method for ascertaining the center-of-gravity height of a motor vehicle, in which
a variable representing the rolling motion of the vehicle about its roll axis oriented in the vehicle longitudinal direction is ascertained,
a variable representing the lateral acceleration of the vehicle is ascertained, and
the center-of-gravity height is ascertained from the variable representing the rolling motion and the variable representing the lateral acceleration.
An essence of the present invention is that
the center-of-gravity height is ascertained only in predefined driving conditions,
the change in the roll rate per unit of time entering into the ascertainment of the predefined driving conditions.

Ascertaining the center-of-gravity height in predefined driving conditions permits a particularly robust determination of the center-of-gravity height. At the same time, this allows the use of simple and therefore not very computing-time-intensive numerical methods which run in a control unit.

One advantageous specific embodiment is characterized in that the variable representing the rolling motion is the roll rate, i.e. the change in the roll angle per unit of time. The roll rate may be ascertained in a simple manner using a roll-rate sensor. The roll-rate sensor is essentially a yaw-rate sensor whose measuring axis is oriented along the vehicle longitudinal axis.

Another advantageous development is characterized in that the variable representing the rolling motion is the roll angle. The roll angle may be obtained in a simple manner from the roll rate by an integration over time.

A further advantageous refinement is characterized in that
in addition to the roll rate, by its integration over time, the roll angle is ascertained, and
the roll angle enters into the ascertainment of the center-of-gravity height.

One advantageous refinement is characterized in that
the product from the mass of the payload and the center-of-gravity height of the payload is ascertained, and
this product enters into the ascertainment of the center-of-gravity height.

This product is easily ascertainable from the motion equation of the vehicle body.

A further advantageous refinement is characterized in that
the center-of-gravity height is ascertained only in predefined driving conditions,
the change in the roll rate over time, as well as the variable representing the lateral acceleration entering into the ascertainment of the predefined driving conditions.

The center-of-gravity height of a vehicle is a property which changes prior to the drive due to the loading or payload of the vehicle,
but generally does not change or does not change frequently during the drive.

Therefore, it is sufficient not to ascertain the center-of-gravity height continuously, but only in those driving conditions which allow a reliable and robust type of ascertainment.

One advantageous specific embodiment is characterized in that, in addition, the variable representing the lateral acceleration enters into the ascertainment of the predefined driving conditions. This variable is already available as a measured variable in vehicles equipped with vehicle dynamics control systems. One advantageous refinement thereof is characterized in that the center-of-gravity height is only ascertained in those driving conditions in which the amount of the change in the roll rate per unit of time ($d^2(f)/dt^2$) is less than a factor (factor) multiplied by the amount of the variable representing the lateral acceleration, that is $$|d^2(f)/dt^2| < \text{Factor} * |a_y S|.$$

One advantageous development is characterized in that
it is ascertained whether the road surface has a gradient in the vehicle transverse direction, and
the center-of-gravity height is only ascertained if a roadway is not inclined or is only negligibly inclined in the vehicle transverse direction.

A further advantageous refinement is characterized in that
to ascertain the center-of-gravity height, at least two driving conditions are considered in which the roll rate has a nearly disappearing value, and
the change in the roll angle between the two driving conditions, and the change in the variable describing the lateral acceleration between the two driving conditions enter into the ascertainment of the center-of-gravity height.

The two last-named refinements in particular make it possible to ascertain the center-of-gravity height in an especially suitable manner.

One advantageous specific embodiment is characterized in that the estimated mass of the vehicle enters into the ascertainment of the center-of-gravity height. When an estimated mass of the vehicle is available, the center-of-gravity height may then be ascertained substantially more precisely.

The device for ascertaining the center-of-gravity height of a motor vehicle includes
first sensor means for ascertaining a variable representing the rolling motion of the vehicle about its roll axis oriented in the vehicle longitudinal direction, and
second sensor means for ascertaining a variable representing the lateral acceleration of the vehicle, as well as
ascertainment means for ascertaining the center-of-gravity height from the variable representing the rolling motion and the variable representing the lateral acceleration.

The ascertainment means are developed so that
the center-of-gravity height is ascertained only in predefined driving conditions,
the change in the roll rate per unit of time entering into the ascertainment of the predefined driving conditions.

DETAILED DESCRIPTION

The height of the center of gravity of a vehicle is an important quantity for safety from the standpoint of driving dynamics. For vehicles having a particularly variable center-of-gravity height (e.g. light utility vans, pickup trucks), the same lateral accelerations may lead to different roll behavior. Thus, a vehicle having a roof load is more likely to roll over than an unloaded vehicle in the same curve with the same speed. To ensure safe operating behavior for such vehicles, as well, the most unfavorable load conditions may be assumed in the application of a vehicle dynamics control system. However, in the case of an unloaded vehicle, this already leads to unwanted interventions of the vehicle dynamics control system during uncritical cornering.

In general, loads which are placed in the vehicle above the center of gravity lead to an elevation of the center of gravity, and therefore to an increase in the rollover tendency of the vehicle about its longitudinal axis ("rollover danger"). This holds true especially for roof loads, which today are already allowed to be up to 100 kg. These additional loads lead to a change in the movement about the longitudinal axis. This rotational movement is substantially more pronounced for a vehicle acted upon by a roof load. Given the same lateral acceleration, the roll angle about the longitudinal axis becomes greater for a vehicle loaded to such an extent than for an unloaded vehicle. However, since as a rule, the roll angle is not directly measured, this condition can only be recognized with difficulty.

However, by comparing the roll-rate signal to the lateral acceleration, the center-of-gravity height may be inferred in stable driving situations. Thus, in stable driving situations, it is possible to infer the danger of the vehicle overturning in future driving situations.

Figure 1:
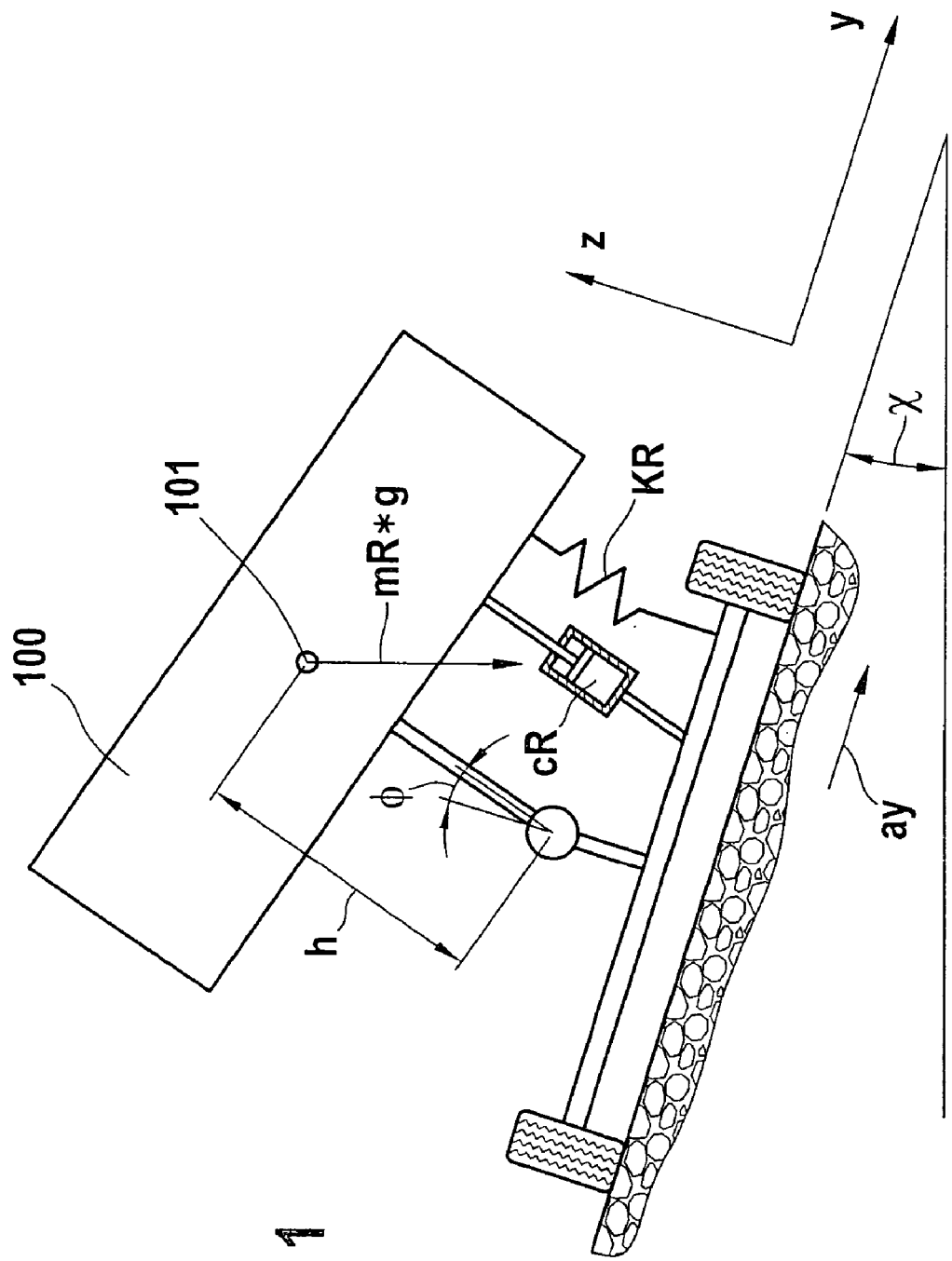
FIG. 1 shows the vehicle in front and rear view, as well as quantities important to the present invention.

A vehicle in front and rear view is shown in schematic form in FIG. 1. The following physical quantities are marked in:

f=roll angle,
mR=mass of the vehicle body
h=distance between the point of rotation of the body and the center of gravity
g=gravitational acceleration
mR*g=weight force of the body acting in the center of gravity
X=angle of gradient of the roadway
KR=spring constant of the vehicle suspension
cR=damping constant of the vehicle damping
ay=lateral acceleration acting on the vehicle in the rotated y-z coordinate system
100=vehicle body
101=center of gravity of the body The general motion equation belonging to roll angle f reads:

$$(Ixx+mR*h^2)*d^2(f)/dt^2 = mR*h*ay - cR*df/dt - KR*f + mR*g*h*\sin(\chi+f) \quad (1)$$

This equation is designated by (1).

In this context, Ixx is the moment of inertia of suspended mass mR about its center of gravity. The rotation point (the piercing point of the roll axis) usually lies substantially below this center of gravity. This distance is designated by h. Suspension KR and damping cR are used in this equivalent sketch for supporting the suspended mass. It should be noted here that KR represents an equivalent spring for the roll stabilizers and the axle springs in the real vehicle. $d^2(f)/dt^2$ characterizes the second time derivation of the roll angle; df/dt characterizes the first time derivation, i.e. the roll rate.

In the present invention, the intention is to ascertain the center-of-gravity height during stable driving situations. For this purpose, only such driving situations are utilized in which the vehicle is located on a level (X=0) roadway and is traveling there in a stable manner.

On a level roadway, the lateral-acceleration sensor measures variable ayS:

$$ayS = ay*\cos(f) + g*\sin(f) \approx ay + g*\sin(f) \quad (2)$$

In this context, ay is the lateral acceleration which is measured when the body is not inclined (i.e. no presence of a rolling motion).

The presence of a level roadway may be determined, for example, in that the model-supported monitoring within the ESP (electronic stability program) system determines a good agreement between the measured yaw rate, the yaw rate estimated with the aid of the steering-wheel angle, and the yaw rate estimated with the aid of the wheel-speed differences.

In the same way, only quasi-static driving situations having only a very small change in the rolling motion (i.e. roll rate) are allowed to be utilized for determining the center-of-gravity height. This is expressed mathematically in the requirement $$|(Ixx+mR*h^2)*d^2(f)/dt^2| < K*|mR*h*ayS| \quad (2a)$$

In this context, K is a predefined value, || indicates the absolute value. Thus, the center-of-gravity height is only ascertained in driving situations having a very small change in the roll rate; the presence of such a situation is expressed, for example, by the satisfaction of the inequation above.

Equation 2a may easily be rewritten in the form $$|d^2(f)/dt^2| < \text{Factor}*|ayS|$$

where the quantity "factor" includes the application parameters contained in equation 2a.

The change in the roll angle during the maneuver is obtained, for example, by the integration over time of the output signal of the roll-rate sensor. Typical times of the transition from straight-ahead driving (roll angle=0) to quasi steady-state circular-course driving (a constant roll angle>0 is present) lie approximately in the area of 0.6 s. This integration may be carried out with only a small error within this brief time interval: A roll-rate sensor has a typical signal noise or an inaccuracy of approximately 1°/s at a measuring frequency of 100 Hz. Within one sampling step, this corresponds to an error of approximately 0.01°. A hundred such measurements are carried out within one second. Therefore, a total error of 0.01°*sqrt(100)=0.1° follows, if the offset of this sensor is determined well.

Alternatively, the roll angle may also be determined
  on the basis of output signals from compression-travel sensors or
  via the integration over time of the output signals from sensors measuring the speed of the compression travel.

In quasi-static driving situations on a level road, according to the prerequisite in equation 1, the left side drops out:

$$mR*h*ay-cR*df/dt-KR*f+mR*g*h*\sin(f)=0 \quad (3)$$

Following from this, including measurement equation (2):

$$mR*h*ayS-cR*df/dt-KR*f=0 \quad (4)$$

Following from this equation:

$$mR*h=(cR*df/dt+KR*f)/ayS \quad (5)$$

Suspended mass mR is composed essentially of two mass components, mR=m0+mz:
- Mass component m0 is made up of the unloaded body including a standard driver. The distance of the center of gravity of this mass from the roll axis is, let us say, h0. These quantities are a function of the construction of the vehicle, and therefore application parameters.
- Additional loads mz are approximated in a first approximation by a further (punctiform) mass. The distance of the center of gravity of these additional loads from the roll axis is, let us say, hz.

This leads to the following equation:

$$m0*h0+mz*hz=(cR*df/dt+KR*f)/ayS \quad (6)$$

Based on this, the product of the payload and its distance to the roll axis (mz*hz) may be determined, for
- m0 and h0 are known application parameters,
- ayS and df/dt are measured values,
- cR and KR are constants and
- f is obtained from df/dt by integration over time.

This method works particularly advantageously if all time derivations of the roll angle prior to and after the steering-wheel motion (steering wheel angle) are to be disregarded:

$$mz*hz=KR*\Delta f/\Delta ayS-m0*h0 \quad (7)$$

Equation (7) is obtained by evaluating equation (6) at two different points of time (point of time 1 and point of time 2); df/dt must be negligible at both points of time.

EXAMPLE

For instance, the point of time immediately prior to entering into a cornering maneuver (straight-ahead driving still exists:→df/dt=0) is selected as point of time 1.

A point of time immediately after concluding the entrance into the cornering (the vehicle is in a steady-state cornering condition:→df/dt=0 is again valid) is selected as point of time 2. At point of time 2, the roll phenomenon (=transient phenomenon of the roll angle) occurring upon entering into the cornering is concluded; a constant roll angle is now present.

Δf is the difference or change of the roll angle, i.e., in the example, the (steady-state) roll angle occurring in the curve, (for prior to beginning the cornering, straight-ahead driving existed, where f=0). ΔayS is the difference or change in the lateral acceleration between the two points of time. In the present example, it is the lateral acceleration occurring during the cornering.

Compared to equation 6, equation 7 has the advantage that it is independent of damping constant cR of the vehicle damping.

Distance hs of the overall center of gravity from the roll axis is calculated as follows:

$$hs=(m0*h0+mz*hz)/(m0+mz) \quad (8)$$

In equation 8
m0 and h0 are known application parameters and
quantity mz*hz is known from equation 6 or equation 7.

Therefore, only the value of additional mass mz is missing for the determination of hs.

If no reliable estimation of the mass for the overall vehicle is available, hz is first predefined according to a worst-case instance. To that end, for example, mass mz is calculated from ascertained value mz*hz in that
- in the case of a passenger car, for instance, a roof load where hz≈1.2 m is assumed and
- in the case of a light utility van, it is assumed that center-of-gravity height hz of additional load mz is located at approximately 75% of the load-compartment height measured from the roll axis, that is to say, in both cases, loads which are placed extremely high are assumed. Because of the values for hz which are assumed as more likely too large, an additional load mz assumed as more likely too small follows (because of the known value of mz*kz). This is designated as mzminroll. It is thus possible to calculate the center-of-gravity height $$hs=(m0*h0+mz*hz)/(m0+mz\text{minroll}).$$

If the total mass is also estimated at the same time in the vehicle, then from this, it is also possible to determine the minimal additional load mzmintotal. This estimation of the mass may be carried out, for example, using the compression-travel sensors of an active chassis or a headlight-leveling system. The "minimal additional load" is the estimated additional load. Since this estimation is frequently associated with a relatively great inaccuracy, for safety reasons, a somewhat smaller value is considered as the estimated value, and this value is designated as minimal additional load mzmintotal.

If this estimated minimal payload mzmintotal is greater than mzminroll, then the payload is estimated at mzmin=mzmintotal.

A lower calculated center-of-gravity height (measured from the roll axis) thereby also results for the payload:

$$hz\text{new}=mz*hz/mz\text{min} \quad (9)$$

From this is also yielded the center-of-gravity height of the overall vehicle over the roll axis:

$$hs=(m0*h0+mz\text{min}*hz\text{new})/(m0+mz\text{min}) \quad (10)$$

The estimates for the load condition are advantageously filtered or ascertained from filtered data, in order to rule out short-duration interference effects. The present invention is advantageously integrated as an additional software module, the ESP control unit (ESP=electronic stability program).

Figure 2:
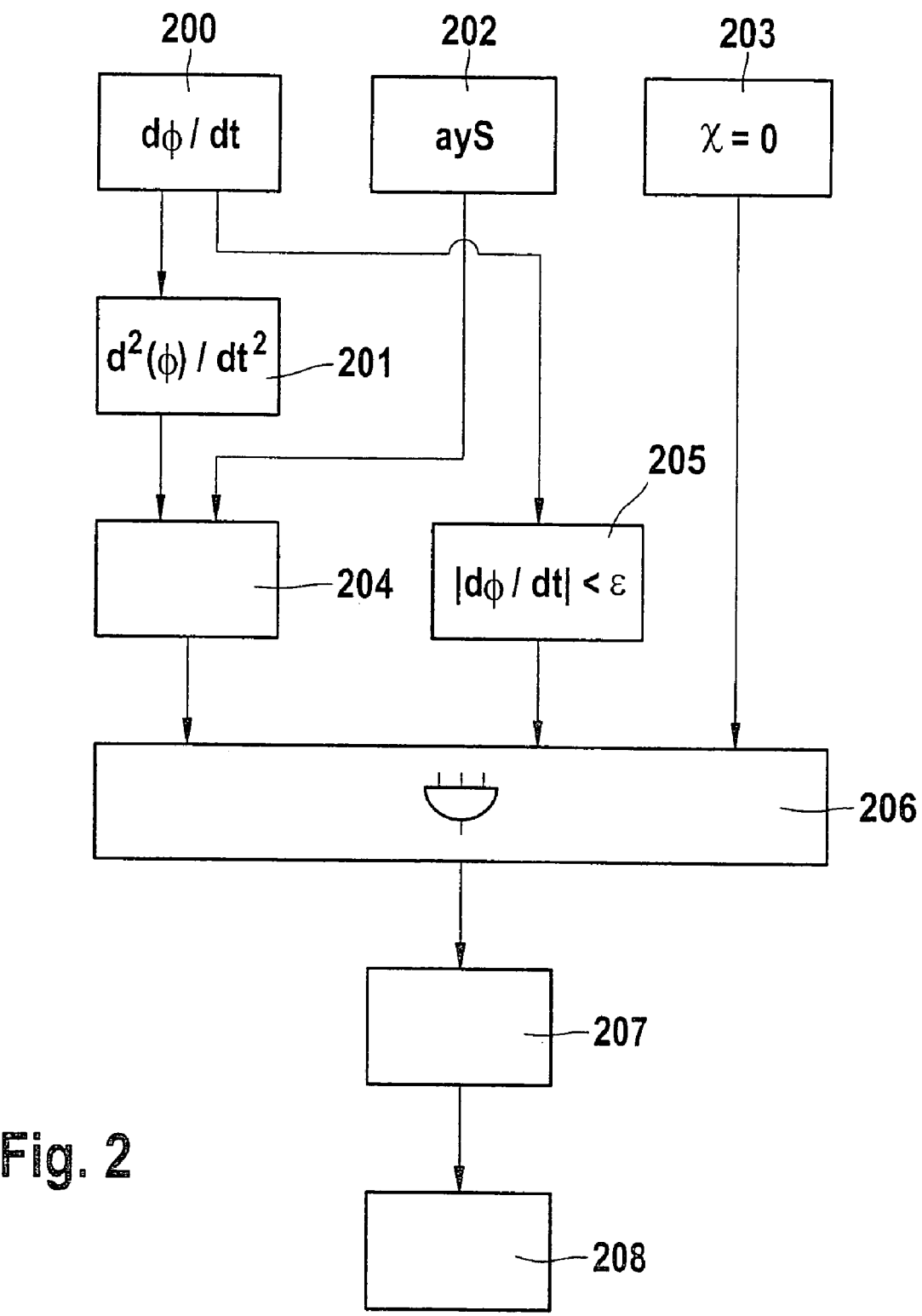
FIG. 2 shows the design of the device according to the present invention.
Figure 3:
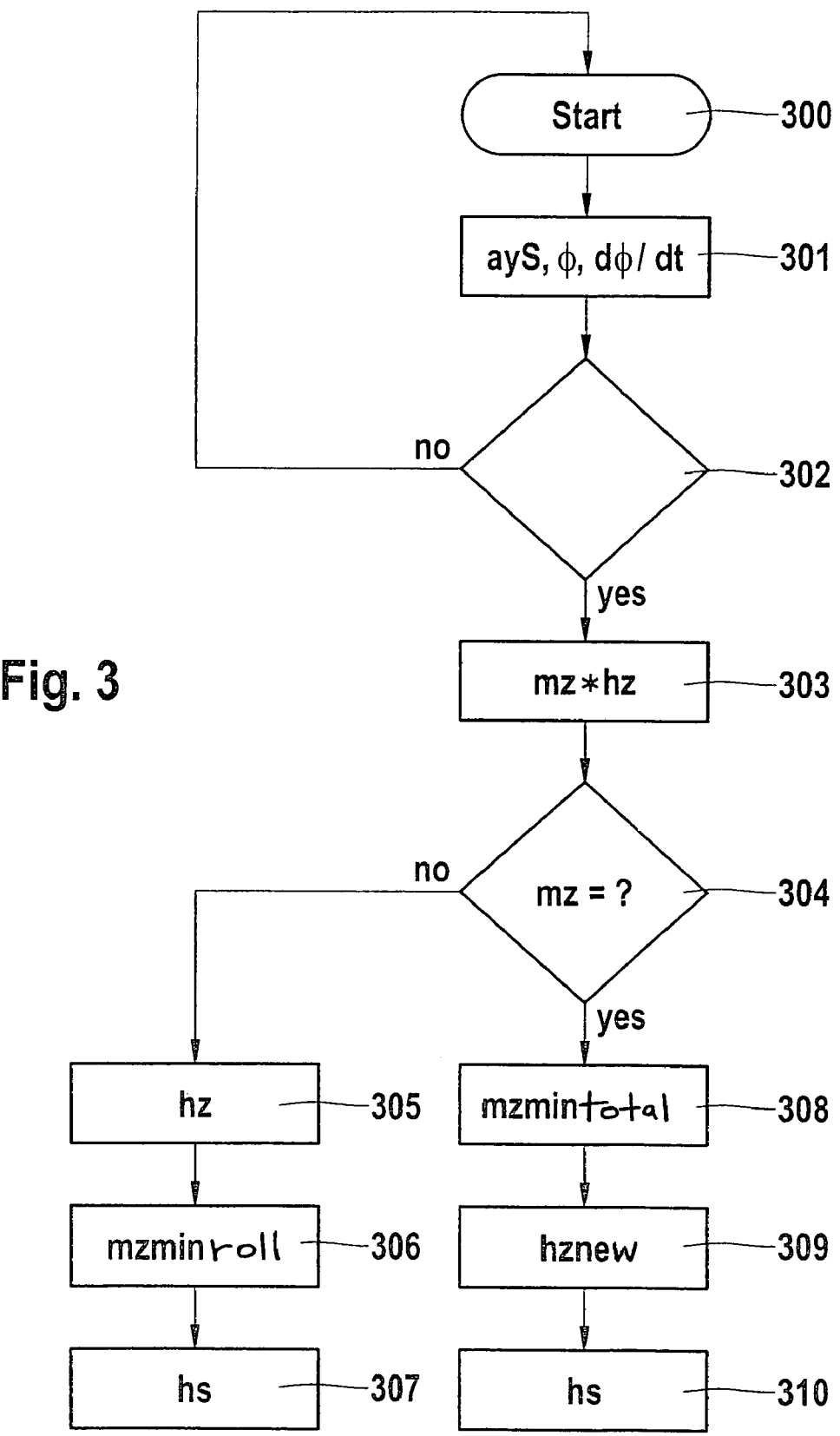
FIG. 3 shows the sequence of the method according to the present invention.

The design of a specific embodiment of the device according to the present invention is shown in FIGS. 2 and 3.

FIG. 2 shows in which driving conditions the center-of-gravity height is ascertained. FIG. 3, on the other hand, shows the sequence for ascertaining the center-of-gravity height.

In FIG. 2, block 200 contains a roll-rate sensor for determining roll rate df/dt; block 202 contains a lateral-acceleration sensor for determining lateral acceleration ayS. The output signals of block 200 are supplied to a differentiation block 201 which ascertains roll acceleration $d^2(f)/dt^2$. The output signals of blocks 201 and 202 are supplied to a comparison block 204. In block 204, it is checked whether a quasi-static driving situation exists. This may be carried out, for example, with the aid of in equation 2a.

The output signal of block 200 is also supplied to a comparison block 205. In comparison block 205, it is checked whether the amount of the roll velocity is sufficiently small, that is, |df/dt|<ε. ε is a specifiable threshold value.

The sensor system of an ESP system is contained in block 203, i.e., wheel-speed sensors, a steering-angle sensor, one or more pressure sensors in the brake circuit, a yaw-rate sensor, as well as a lateral-acceleration sensor. The lateral-acceleration sensor may perfectly well be the same sensor as in block 202.

In block 203, it is checked whether a sufficiently level roadway (crossfall angle X=0) exists, and whether the vehicle is in a stable driving condition from the standpoint of driving dynamics.

The output signals of the three blocks 204, 205 and 203 are supplied to an AND gate 206.

This AND gate enables the ascertainment of the center-of-gravity height when the following three conditions are met:

1. The presence of a quasi-static driving situation was determined in block 204.
2. A sufficiently small amount value for the roll rate was determined in block 205.
3. A roadway which is not inclined or is inclined only insignificantly in the cross direction, as well as a stable driving condition were determined in block 203.

If at least one of the three conditions is not met, then the ascertainment method begins anew and no center-of-gravity height is ascertained at the instantaneous point of time. However, if all three authorization conditions are met, then the height of the center of gravity is determined in block 207. The output signals of block 207 are routed to block 208. Block 208 is, for example

- actuator means for carrying out driver-independent braking interventions or engine-torque interventions, or
- parameterization means for parameterization of a vehicle-dynamics-control system (e.g. ESP) as a function of the ascertained center-of-gravity height, or
- information means, by which the driver is informed about the instantaneously ascertained center-of-gravity height.

It should be added with respect to block 205 that this block is only necessary when quantity mz*hz is ascertained according to equation 7. If quantity mz*hz is calculated according to equation 6, then block 205 is deleted, i.e., is bridged over.

FIG. 3 shows the sequence for ascertaining the center-of-gravity height. The connection with FIG. 2 is that the method described in FIG. 3 is carried out in block 207 of FIG. 2. The method starts in block 300. Variables ayS, df/dt and f are subsequently ascertained in block 301. In block 302, it is thereupon checked whether a quasi-static driving condition exists. This may be carried out, for example, with the aid of inequation 2a. If no quasi-static driving condition exists ("no"), then there is a return to block 300. However, if a quasi-static driving condition exists ("yes"), then variable mz*hz is subsequently formed in block 303. This may be carried out, for example, with the aid of equation 6 or with the aid of equation 7. In block 304, it is subsequently checked whether mass mz of the payload is known (e.g., ascertained using compression-travel sensors).

If mz is not known ("no"), then a "pessimistic" estimate for hz is subsequently ascertained in block 305 ("worst-case instance"). The "pessimistic estimate" means that a relatively large value is assumed for hz, in the case of a passenger car, for example, a roof load where hz≈1.2 m. Following that, in block 306, variable mzminroll is calculated (value mz*hz from block 303 is divided by the value of hz from block 305), and from that, the value of hs is subsequently ascertained in block 307.

On the other hand, if mz is known (query result "yes" in block 304), then subsequently in block 308, for safety reasons, this ascertained value of mz is slightly reduced again in order to compensate for possible measurement uncertainties. This reduced value is designated by mzmintotal. Center-of-gravity height hznew of the payload is subsequently calculated in block 309, and from that, the total center-of-gravity height is calculated in block 310.

What is claimed is:

1. A method for ascertaining a center-of-gravity height of a motor vehicle, comprising:
   - ascertaining a variable representing a rolling motion of the vehicle about its roll axis oriented in a vehicle longitudinal direction;
   - ascertaining a variable representing a lateral acceleration of the vehicle; and
   - ascertaining the center-of-gravity height as a function of the variable representing the rolling motion and the variable representing the lateral acceleration, the center-of-gravity height being ascertained only in predefined driving conditions, the predefined driving conditions being a function of a change in a roll rate per unit of time.

2. The method according to claim 1, wherein the variable representing the rolling motion is the roll rate, the roll rate being a change in a roll angle per unit of time.

3. The method according to claim 2, further comprising ascertaining the roll rate and, by an integration of the roll rate over time, ascertaining the roll angle, the center-of-gravity height being ascertained as a further function of the roll angle.

4. The method according to claim 1, wherein the variable representing the rolling motion is a roll angle.

5. The method according to claim 1, wherein the ascertaining of the center-of-gravity height includes ascertaining a product of a mass of a payload of the vehicle and a center-of-gravity height of the payload.

6. The method according to claim 1, further comprising ascertaining the predefined driving conditions as a further function of the variable representing the lateral acceleration.

7. The method according to claim 6, wherein the center-of-gravity height is ascertained only in those driving conditions in which an amount of the change in the roll rate per unit of time is less than a factor multiplied by an amount of the variable representing the lateral acceleration.

8. The method according to claim 1, further comprising ascertaining whether a road surface has a gradient in a vehicle transverse direction, the center-of-gravity height being ascertained only in the case of a roadway which is one of (a) not inclined and (b) only negligibly inclined in the vehicle transverse direction.

9. The method according to claim 1, wherein the center-of-gravity height is ascertained as a further function of an estimated mass of the vehicle.

10. A method for ascertaining a center-of-gravity height of a motor vehicle, comprising:
    - ascertaining a variable representing a rolling motion of the vehicle about its roll axis oriented in a vehicle longitudinal direction;
    - ascertaining a variable representing a lateral acceleration of the vehicle; and
    - ascertaining the center-of-gravity height as a function of the variable representing the rolling motion and the variable representing the lateral acceleration, the center-of-gravity height being ascertained only in predefined driving conditions, the predefined driving conditions being a function of a change in a roll rate per unit of time, wherein the variable representing the rolling motion is the roll rate, the roll rate being a change in a roll angle per unit of time, and wherein the center-of-gravity height is ascertained considering at least two driving conditions in which the roll rate has a substantially disappearing value, as a further function of a change in the roll angle between the two driving conditions and a change in the variable representing the lateral acceleration between the two driving conditions.

11. A device for ascertaining a center-of-gravity height of a motor vehicle, comprising:

first sensor means for ascertaining a variable representing a rolling motion of the vehicle about its roll axis oriented in a vehicle longitudinal direction;

second sensor means for ascertaining a variable representing a lateral acceleration of the vehicle; and ascertainment means for ascertaining the center-of-gravity height as a function of the variable representing the rolling motion and the variable representing the lateral acceleration, the center-of-gravity height being ascertained only in predefined driving conditions, the predefined driving conditions being a function of a change in a roll rate per unit of time.

* * * * *